April 23, 1935.  V. G. APPLE ET AL  1,998,918
BRAKE CONTROL MECHANISM
Filed Jan. 16, 1930
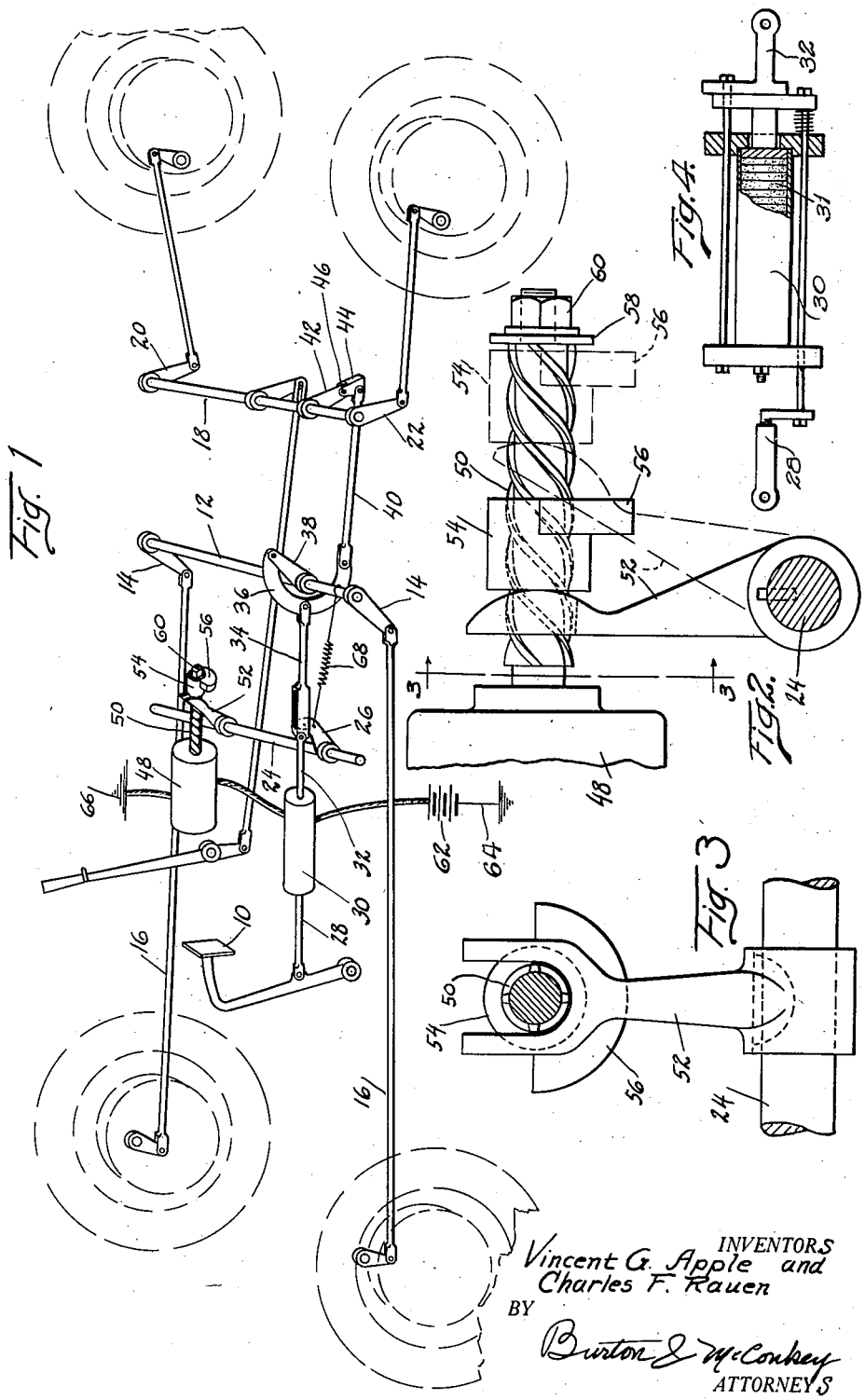
INVENTORS
Vincent G. Apple and
Charles F. Rauen
BY
Burton & McConkey
ATTORNEYS Patented Apr. 23, 1935

1,998,918

UNITED STATES PATENT OFFICE 1,998,918

BRAKE CONTROL MECHANISM

Vincent G. Apple and Carl F. Rauen, Dayton, Ohio, assignors to Bendix Brake Company, South Bend, Ind., a corporation of Illinois Application January 16, 1930, Serial No. 421,327

4 Claims. (Cl. 188—156)

Our invention relates to improvements in vehicle brake mechanism and particularly to combined power and manual operating means for vehicle brakes.

An object is the provision of improved power means and an improved control therefor operable to augment the effort of the manual means in applying the brakes, and to so couple the power means with the brakes that such means supplements the brake applying effort of the manual means in a direct proportion to such effort, and is controlled by the control exercised over such manual means, yet permits, in the event of failure of the power means, operation of brakes by the manual means independently of the power means.

A meritorious feature is the provision of a control to the power means which will vary the power output applied to the brakes in direct proportion to the effort exercised on the manual means manually to apply the brakes. This control forms a part of the mechanical linkage between the manually operable brake applying member and the brakes and serves as a mechanical tension transmitting part of such linkage. The control device here shown is described and claimed in a co-pending application of Vincent G. Apple, being Serial No. 285,091, filed June 13, 1928 and issuing as Patent No. 1,904,813.

Other desirable features and characteristics of our invention will more fully appear from the following description, appended claims and accompanying drawing, wherein,—

Fig. 1 is a diagrammatical view of the brake mechanism embodying our invention.

Fig. 2 is a side elevation partly in section of the power operating means, and

Fig. 3 is a view taken along the line 3—3 of Fig. 2.

Fig. 4 is a detailed view, partly in section, of the electric control mechanism.

In the diagrammatical view of Fig. 1, let 10 indicate the brake pedal, 12 the brake shaft which is coupled to the front wheel brakes through arms 14, and rods 16, and 18 indicates the brake shaft which is coupled with the rear wheel brakes through arms 20 and rods 22.

Between the brake pedal and the brake shaft 12 there is journaled transversely of the chassis a third brake shaft 24, which is a power shaft, having an arm 26 secured thereto. The brake pedal is connected by a rod 28, carbon pile rheostat 30, rod 32, and rod 34 with an arcuate equalizer 36, intermediate its ends. The carbon pile rheostat between the rods 28 and 32 is shown in detail in Fig. 4.

The equalizer has its upper end pivoted to an arm 38 mounted on brake shaft 12 to rotate shaft 12 to apply the front wheel brakes and its lower end connected by a rod 40 and an arm 42 with brake shaft 18 to rotate such shaft to apply the rear wheel brakes. The rod 40 is connected with the arm 42 by a swinging coupling 44 which is pivoted to the arm 42 at 46 and overhangs the rear edge of such arm to swing the arm forwardly to rotate the shaft 18 while permitting the rotation of the shaft 18 without actuating the rod 40.

The rod 34 is forked at its forward end to receive the operating end of the lever 26 to be tensioned thereby upon rotation of the shaft 24 and is connected with rod 32 to be tensioned thereby upon depression of the brake pedal.

An electric motor 48 is secured to some point on the chassis frame and is provided with a threaded extension 50 of relatively high angularity on its armature shaft. A brake actuating arm 52 is keyed to the shaft 24 and is provided at its extremity with a bifurcated portion which straddles the threaded extension of the armature shaft.

Mounted on the armature shaft is an internally threaded runner 54. This runner is provided with a depending weighted portion 56 which prevents the said runner turning with the shaft as the latter rotates. The result is that the runner slides axially of the armature shaft as the latter rotates, and is prevented from sliding off the armature shaft at its outer extremity by means of the plate 58 secured to said outer extremity by means of the nut 60.

Thus it will be seen that the runner 54, as it slides to the left on the armature shaft, bears against the rounded prongs of the bifurcated brake arm 52 and forces it also to the left, thus rotating the brake shaft 24 and functioning to apply the brakes through the medium of the arm 26 and the described linkage. This rounded portion of the prong is designed to lessen the frictional resistance of the said arm to the runner as the latter forces it during its axial movement.

The electric current to rotate the motor is furnished from a conventional storage battery 62 and the circuit includes the carbon pile rheostat 30. It is clearly apparent from Fig. 4 that the tensioning of the rods 28 and 32 will cause the carbon piles 31 to be compressed therebetween. As is well known, resistance through the carbon discs of such a rheostat decreases directly as the carbon discs are brought more closely together under pressure. Thus it is obvious that as pressure is manually exerted on the brake pedal the resistance through the rheostat will be decreased as the carbon discs therein are pressed more closely together, and a current of greater strength will be supplied to the electric motor 48. The battery has a ground 64 and the motor has a ground 66. This carbon pile rheostat is described in detail in a copending application of Vincent G. Apple, Serial No. 285,091, filed June 13, 1928, which issued as Patent No. 1,904,813.

Therefore, the braking torque produced by the electric motor, or booster mechanism, will at all times be in direct ratio to the force being transmitted through the mechanical linkage from the pressure manually exerted on the brake pedal.

Furthermore, by virtue of the slotted connection between the arm 26 and the rod 34 the brakes may be manually applied through the described linkage without in any way affecting the "booster" mechanism and in case the latter should fail. This complete independence of manual application is also made possible by the fact that there is a disconnected engagement between the "booster" mechanism or, in other words, the rotating armature shaft 50 and the lever arm 52 which transmits the power from the rotating armature shaft to the brake shaft 24 and thence through the linkage to the brakes.

The brakes are released upon removal of pressure from the brake pedal 10 by means of the customary retraction means not shown which functions to withdraw the brake pedal to its inoperative position. Upon such withdrawal of the brake pedal 2, the resistance set up in the rheostat approaches a maximum or, in other words, reduces the current flowing through the motor to rotate the armature shaft to zero. During this withdrawal action the weighted runner 54 on the armature shaft is forced axially to the right by the brake arm 52, rotating the shaft 50 as it goes, until it reaches the outer extremity of the armature shaft, as shown in the dotted lines in Fig. 2. This brake arm 52 is swung to force the runner as described to its normal position by spring 68 acting thereon through arm 26 and shaft 24.

We claim:

1. Brake mechanism comprising, in combination, a rotatable brake shaft, a plurality of brakes operatively connected therewith, a power rotated shaft disconnectedly coupled with said brake shaft to rotate the same, manual means for rotating said shaft, said manual means including tension means constituting a tension element in the manual actuating means whereby every increment of tension therein proportionally augments the power delivered by said power shaft.

2. Brake mechanism comprising, in combination, a rotatable brake shaft, a plurality of brakes operatively connected therewith, a power rotated shaft disconnectedly coupled with said shaft to rotate the same, manual means for rotating said brake shaft, said manual means including tension means constituting a tension element in the manual actuating means whereby every increment of tension therein proportionally augments the power delivered by said power shaft, and means permitting manual rotation of the brake shaft independently of the power means.

3. Brake mechanism comprising, in combination, a rotatable brake shaft, a plurality of brakes operatively connected therewith, an electric motor having an armature shaft, means disconnectedly coupling the two shafts whereby rotation of the armature shaft rotates said brake shaft, and manual means for rotating said brake shaft, said means including tension means whereby every increment of tension therein proportionally augments the current through said motor.

4. In combination with brakes and manual means for actuating the same, a non-reversible electric motor having a threaded armature shaft, means for energizing said motor upon initial operation of said manual means, a threaded runner on said armature shaft disconnectedly coupling said armature shaft and the manually operable means whereby power is transmitted to the brakes, and tension means adapted to release the brakes upon release of the manually operable means, the angularity of the thread on said armature shaft and the tension of said means being adapted to permit reverse rotation thereof through said disconnected coupling upon deenergization of the motor.

VINCENT G. APPLE.
CARL F. RAUEN.

CERTIFICATE OF CORRECTION.

Patent No. 1,998,918.  April 23, 1935.

VINCENT G. APPLE, ET AL.

It is hereby certified that error appears in the printed specification of the above numbered patent requiring correction as follows: Page 2, second column, line 29, claim 3, after "means" second occurrence, insert the words constituting a tension element in the manual actuating means; and that the said Letters Patent should be read with this correction therein that the same may conform to the record of the case in the Patent Office.

Signed and sealed this 19th day of November, A. D. 1935.

(Seal)

Leslie Frazer
Acting Commissioner of Patents.